United States Patent
Chen

(10) Patent No.: US 12,481,949 B1
(45) Date of Patent: Nov. 25, 2025

(54) SYSTEMS AND METHODS FOR FACILITATING MANAGING OF SUPPLY CHAINS OF ITEMS

(71) Applicant: RecycleGO Inc., Irvington, NJ (US)

(72) Inventor: Stanley Chen, Dobbs Ferry, NY (US)

(73) Assignee: RecycleGO Inc, Irvington, NJ (US)

( * ) Notice: Subject to any disclaimer, the term of this patent is extended or adjusted under 35 U.S.C. 154(b) by 0 days.

(21) Appl. No.: 18/925,204

(22) Filed: Oct. 24, 2024

Related U.S. Application Data

(63) Continuation of application No. PCT/US2024/047930, filed on Sep. 23, 2024.

(51) Int. Cl.
  *G06Q 10/083* (2024.01)

(52) U.S. Cl.
  CPC .................. *G06Q 10/083* (2013.01)

(58) Field of Classification Search
  CPC ....... G06Q 10/083; G06Q 50/40; G06Q 50/60
  See application file for complete search history.

(56) References Cited

U.S. PATENT DOCUMENTS

| | | | |
|---|---|---|---|
| 11,182,808 B2 | 11/2021 | Ohana et al. | |
| 11,354,621 B2 | 6/2022 | Makhija et al. | |
| 11,526,947 B2 * | 12/2022 | Jones | H04W 4/38 |
| 2003/0167265 A1 * | 9/2003 | Corynen | G06Q 10/04 |
| 2015/0253144 A1 * | 9/2015 | Rau | G01C 21/343 |
| | | | 705/348 |
| 2016/0042321 A1 * | 2/2016 | Held | G06Q 10/08355 |
| | | | 705/338 |
| 2017/0140312 A1 | 5/2017 | Pai et al. | |
| 2020/0311615 A1 * | 10/2020 | Jammalamadaka | G06N 20/20 |
| 2022/0051765 A1 * | 2/2022 | Wang | G01W 1/10 |
| 2023/0115185 A1 * | 4/2023 | Huang | G06F 3/0484 |
| 2023/0237386 A1 | 7/2023 | Raut et al. | |
| 2024/0062151 A1 | 2/2024 | Cheng et al. | |

FOREIGN PATENT DOCUMENTS

| | | | | |
|---|---|---|---|---|
| WO | WO 2024/129164 A1 * | 6/2024 | | G06Q 10/04 |

OTHER PUBLICATIONS

Avvari, Gopi Vinod, Sidoti, David, Zhang, Lingyi, Mishra, Manisha, Pattipati, Krishna, Sampson, Charles R., and Hansen, James, "Robust Multi-Objective Asset Routing in a Dynamic and Uncertain Environment," 2018 IEEE Aerospace Conference, IEEE, 2018.*

* cited by examiner

*Primary Examiner* — Nathan Erb
(74) *Attorney, Agent, or Firm* — Dhiraj Jindal; PATENT YOGI LLC

(57) ABSTRACT

The present disclosure provides a method for facilitating managing of supply chains of items. Further, the method includes receiving supply chain data associated with a supply chain of items from devices. Further, the supply chain includes a transportation of the items. Further, the method includes obtaining additional data based on the supply chain data. Further, the method includes analyzing the additional data using machine learning models based on the supply chain data. Further, the method includes determining a disruption in the supply chain based on the analyzing of the additional data. Further, the method includes generating recommendations for mitigating the disruption in the supply chain based on the disruption. Further, the method includes transmitting the recommendations to the devices. Further, the method includes storing the additional data.

16 Claims, 10 Drawing Sheets

SYSTEMS AND METHODS FOR FACILITATING MANAGING OF SUPPLY CHAINS OF ITEMS

CROSS-REFERENCE TO RELATED APPLICATION

This application is a bypass application of International Application No. PCTPCT/US24/47930 filed on Sep. 23, 2024 and titled "SYSTEMS AND METHODS FOR FACILITATING MANAGING OF SUPPLY CHAINS OF ITEMS", the entirety of which is incorporated by reference herein.

FIELD OF DISCLOSURE

Generally, the present disclosure relates to the field of data processing. More specifically, the present disclosure relates to systems and methods for facilitating managing of supply chains of items.

BACKGROUND

The field of data processing is technologically important to several industries, business organizations, and/or individuals. In particular, the use of data processing is prevalent for facilitating managing of supply chains of items.

Existing techniques for facilitating managing of supply chains of items are deficient with regard to several aspects. For instance, current technologies provide management of transportation of items in the supply chains. As a result, different technologies are needed that predict conditions affecting the transportation of the items and provide suggestions. Furthermore, the current technologies use machine learning algorithms for managing the supply chains of the items. Further, current machine learning (ML) models use traditional feedforward machine learning (ML) algorithms and conventional cpu processing methods that consume a large quantity of resources (such as power and water). Further, the consumption of the large quantity of resources puts constraints on the usage of the current machine learning algorithm. Further, the constraints are processing requirements and inefficiency associated with the current machine learning (ML) models. For example, Chatgpt uses 500 milliliters of water for every 50 characters processed and 185,000 gallons of water is used to train Chatgpt3. Further, the current ML model may be highly inefficient and uses a lot of natural resources.

Therefore, there is a need for improved systems and methods for facilitating managing of supply chains of items that may overcome one or more of the above-mentioned problems and/or limitations.

SUMMARY OF DISCLOSURE

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present disclosure provides a method for facilitating managing of supply chains of items. Further, the method may include receiving, using a communication device, one or more supply chain data associated with a supply chain of one or more items from one or more devices. Further, the supply chain includes a transportation of the one or more items. Further, the method may include obtaining, using a processing device, one or more additional data associated with the supply chain based on the one or more supply chain data. Further, the method may include analyzing, using the processing device, the one or more additional data using one or more machine learning models based on the one or more supply chain data. Further, the method may include determining, using the processing device, a disruption in the supply chain based on the analyzing of the one or more additional data. Further, the method may include generating, using the processing device, one or more recommendations for mitigating the disruption in the supply chain based on the disruption. Further, the method may include transmitting, using the communication device, the one or more recommendations to the one or more devices. Further, the method may include storing, using a storage device, the one or more additional data.

The present disclosure provides a system for facilitating managing of supply chains of items. Further, the system may include a communication device. Further, the communication device may be configured for receiving one or more supply chain data associated with a supply chain of one or more items from one or more devices. Further, the supply chain includes a transportation of the one or more items. Further, the communication device may be configured for transmitting one or more recommendations to the one or more devices. Further, the system may include a processing device communicatively coupled with the communication device. Further, the processing device may be configured for obtaining one or more additional data associated with the supply chain based on the one or more supply chain data. Further, the processing device may be configured for analyzing the one or more additional data using one or more machine learning models based on the one or more supply chain data. Further, the processing device may be configured for determining a disruption in the supply chain based on the analyzing of the one or more additional data. Further, the processing device may be configured for generating the one or more recommendations for mitigating the disruption in the supply chain based on the disruption. Further, the system may include a storage device communicatively coupled with the processing device. Further, the storage device may be configured for storing the one or more additional data.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTIONS OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF DISCLOSURE

Figure 1:
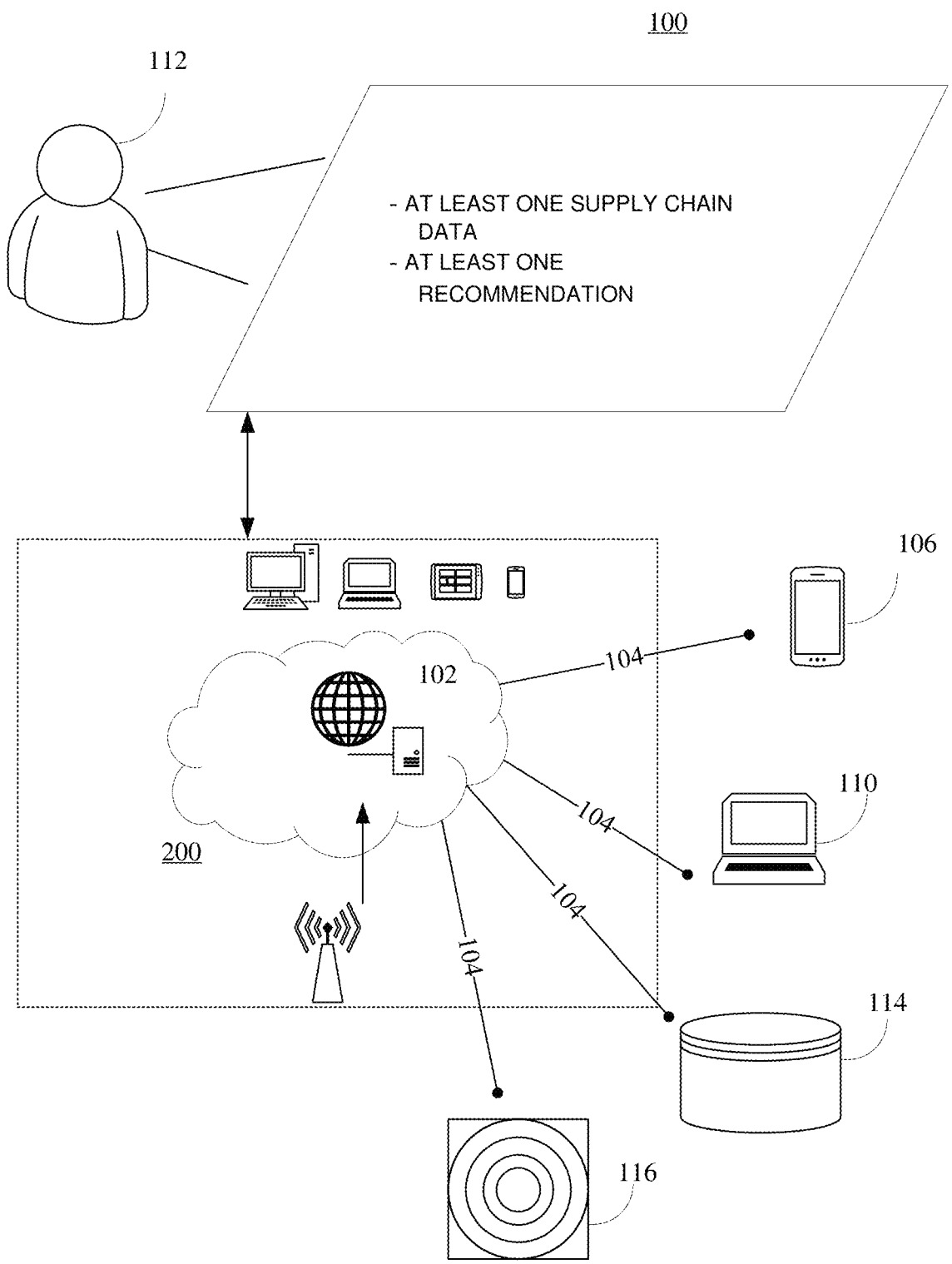
FIG. 1 is an illustration of an online platform 100 consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of the disclosed use cases, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes systems and methods facilitating managing of supply chains of items.

Further, the present disclosure describes retrieving and analyzing additional data (e.g. environmental, geo-political, etc.) in order to identify a potential supply chain disruption and accordingly identify and provide alternatives/recommendations.

Accordingly, such data may be obtained from a variety of sources including, but not limited to, satellites, drones, stationed sensors, moving sensors, IoT devices, vehicles, and so on. For example, satellite data may be analyzed in order to determine data such as the number of vehicles stationed at a port and corresponding duration which may in some embodiments determine a supply chain disruption.

Further, the present disclosure describes using self-hosted, Open Source Base LLMs such as the likes of Llama, Claude, Mistral, and Falcon; which is infused with additional private (publicly unavailable) data embedded as Retrieval Augmented Generation Model (RAG). Fine Tuning is done based on customer requirements on stand-alone and customer-targeted deployments in a consultative manner. This is done this way, since every customer's requirements change and are likely unique.

Further, current/real-time base weather data is usually received via external API services for facilitating the managing of the supply chains of the items. However, historical weather information datasets for oceans and land which are maintained and curated are plugged into proprietary Machine Learning models that are spread over statistical models such as Regression/Timeseries, ARIMA, etc., to near-accurately predict future weather events for given sets of geographies. The prediction outputs from the ML models are then overlaid with Meteorological forecasts by the region's Met departments to fix and iron out errors or outliers. The stack/models affect supply chain tracking and supply chain disruption event forecasting. Environmental impact is not artificial intelligence (AI) dependent currently and the potential $CO_2$ emissions are computed based on supply chain distance and other parameters such as Carrier Gross Weight, Speed, Current Weather Conditions, Current Sea Tides, etc.

Further, the present disclosure describes a localize processing of data using quantum algorithms, to allow for data processing to happen in real time, in localized regions, as opposed to needing to have data transmitted to the cloud. The amount of data and cost associated with transmitting that data that needs to be processed may be so high that it is prohibitive. Further, the system that transmits the data that needs to be processed is dependent on a central processing data center, making the system weaker. Further, the usage of the quantum algorithms significantly reduces the usage of the resources (such as water and power) and have a much lower carbon footprint.

Further, the present disclosure describes a novel use case of edge computing in conjunction with detecting scenarios of disruption where access to a central cloud computing center is not available and being able to process predictive models to mitigate risk to supply chains at the "Edge" aka localized region rather than rely on sending data to a central data center in the cloud.

FIG. 1 is an illustration of an online platform 100 consistent with various embodiments of the present disclosure. By way of non-limiting example, the online platform 100 to facilitate managing of supply chains of items may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 200.

Figure 2:
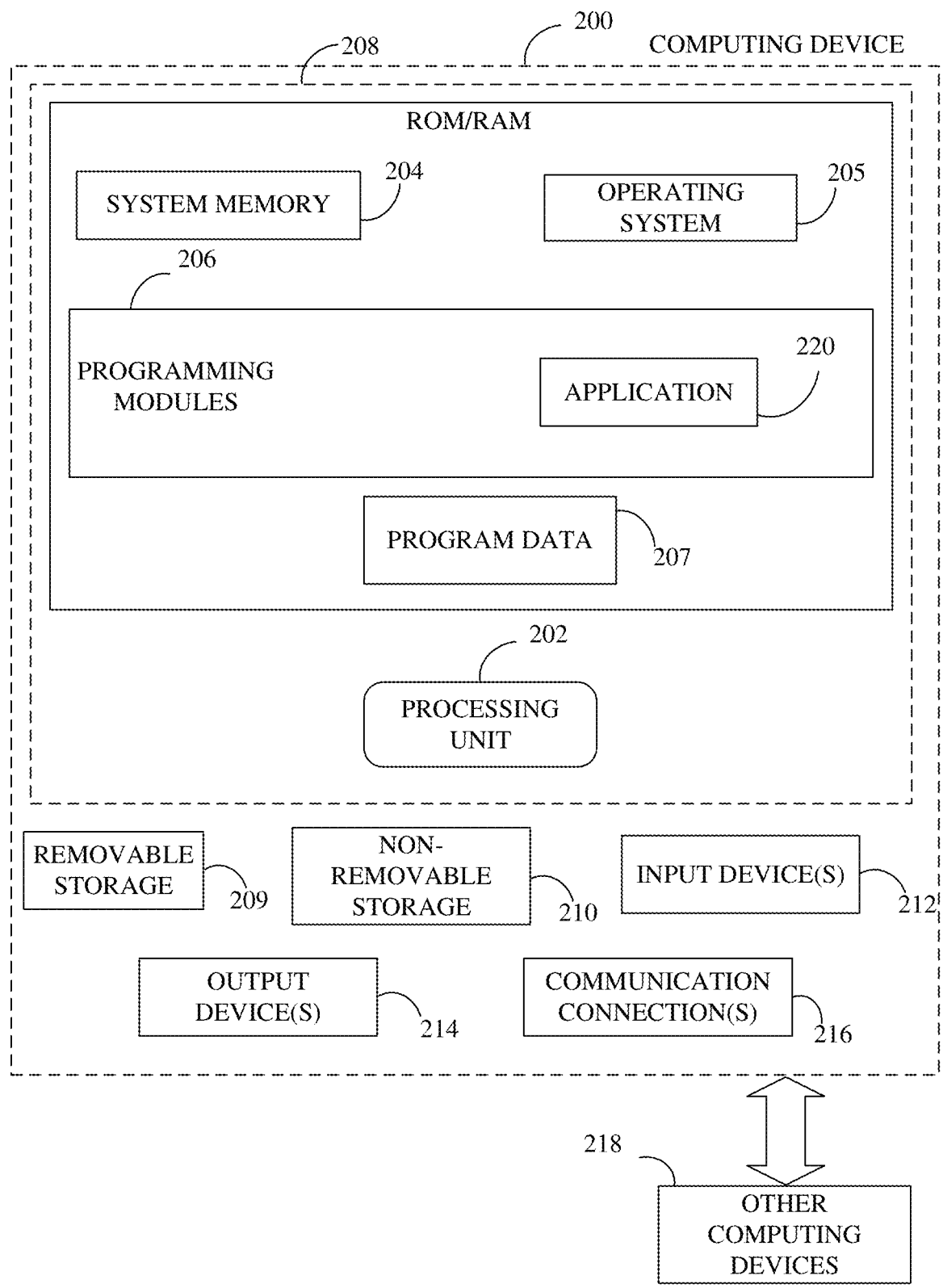
FIG. 2 is a block diagram of a computing device 200 for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g. random-access memory (RAM)), non-volatile (e.g. read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable, and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD), or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3:
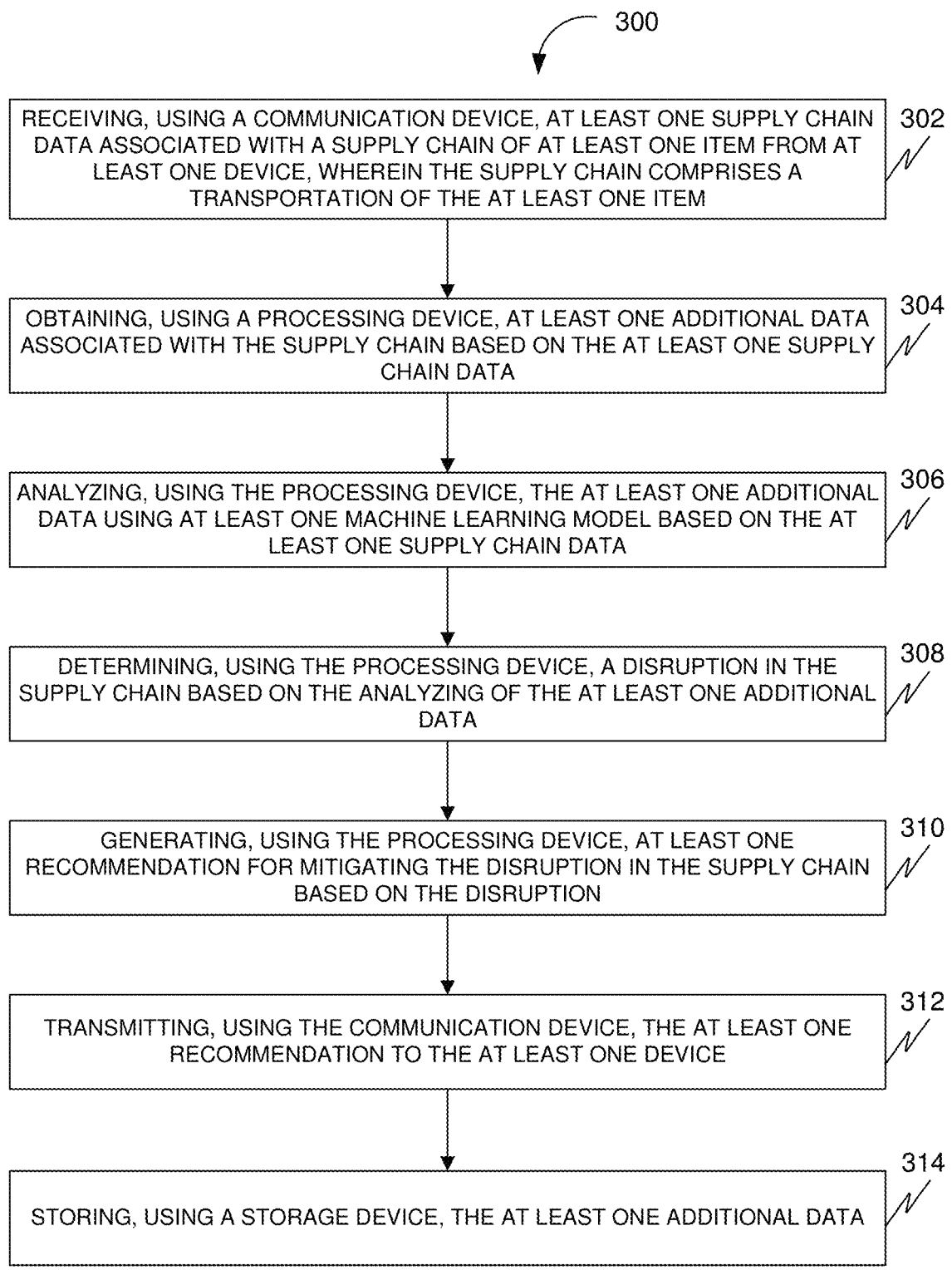
FIG. 3 illustrates a flowchart of a method 300 for facilitating managing of supply chains of items, in accordance with some embodiments.

FIG. 3 illustrates a flowchart of a method 300 for facilitating managing of supply chains of items, in accordance with some embodiments.

Accordingly, the method 300 may include a step 302 of receiving, using a communication device 902, one or more supply chain data associated with a supply chain of one or more items from one or more devices. Further, the supply chain includes a transportation of the one or more items. Further, the one or more supply chain data may include data associated with the transportation of the one or more items. Further, the data associated with the transportation may include a location of the one or more items, a mode of the transportation for transporting the one or more items, a pathway for the transportation of the one or more items, a means of the transportation of the one or more items, a schedule of the transportation of the one or more items, etc. Further, the one or more items may include objects, products, articles, cargo, etc. Further, the one or more devices may include client devices, computing devices, user devices, etc. Further, the one or more devices may include global positioning systems (GPS) devices, radio frequency identification (RFID) tags, IoT sensors, Bluetooth beacons, onboard diagnostic (OBD) devices, etc. Further, the transportation may include a shipment, a freighting, etc. Further, the supply chain may include a path or network between supply chain entities. Further, the supply chain represents a sequence of interconnected steps for transporting the one or more items. Further, the one or more supply chain data may be "trusted" and verifiable by 3rd parties. Further, the one or more supply chain data may include a data associated with logistical operations of organizations. Further, the receiving of the one or more supply chain data may include accessing one or more distributed ledgers associated with one or more blockchains. Further, the receiving of the one or more supply chain data may include obtaining the one or more supply chain data from the one or more distributed ledgers based on the accessing. Further, the one or more supply chain data may be stored on the one or more distributed ledgers. Further, the one or more devices may include a gateway device, a node device, etc. associated with the one or more blockchains. Further, the one or more distributed ledgers may be updated based on a supply chain data from a blockchain network. Further, the one or more distributed ledgers may be immutable and transparent data sources. Further, the one or more supply chain data may include a supply chain data of the one or more items in the supply chain at a current instance. Further, the one or more distributed ledgers may be implemented by the one or more blockchains to verifiably store a plurality of supply chain data of the one or more items in the supply chain at a plurality of instances. Further, the receiving of the one or more supply chain data may include interacting with one or more smart contracts stored on the one or more distributed ledgers for obtaining the one or more supply chain data.

Further, the method 300 may include a step 304 of obtaining, using a processing device 904, one or more additional data associated with the supply chain based on the one or more supply chain data. Further, the one or more additional data may be associated with one or more external conditions. Further, the one or more external conditions may include weather conditions, economic conditions, regulatory conditions, geopolitical conditions, political conditions, labor shortage conditions, currency fluctuation conditions, raw material availability conditions, consumer demand conditions, constraint conditions, regulatory compliances, transportation infrastructure conditions, etc. Further, the one or more additional data may include one or more types of the one or more additional data. Further, the one or more types of the one or more additional data may include a weather data associated with weather events, a news data associated with geopolitical events, an astronomical data associated with astronomical events, a geological data associated with geological events (such as tsunami, earthquake), a medical data associated with medical events (such as epidemic, pandemic, endemic, etc.), a financial data associated with financial events (such as economic disruptions, etc.), etc. Further, the one or more types of the one or more additional data may be obtained from one or more IoT devices. Further, each of the one or more IoT devices detects one or more event types. Further, the one or more event types may include the weather events, the geopolitical events, the astronomical events, geological events, the medical events, the financial events, etc. Further, the obtaining of the one or more additional data may include generating the one or more additional data based on the detecting of the one or more event types. Further, the obtaining of the one or more additional data may include accessing one or more first distributed ledgers associated with one or more first blockchains. Further, the obtaining of the one or more additional data may include obtaining the one or more additional data from the one or more first distributed ledgers based on the accessing. Further, the one or more additional data may be stored on the one or more distributed ledgers. Further, the one or more distributed ledgers may be updated based on an additional data from a first blockchain network. Further, the one or more first distributed ledgers may be implemented by the one or more first blockchains to verifiably store a plurality of additional data at a plurality of instances. Further, the obtaining of the one or more additional data may include interacting with one or more first smart contracts stored on the one or more first distributed ledgers for obtaining the one or more additional data.

Further, the method 300 may include a step 306 of analyzing, using the processing device 904, the one or more additional data using one or more machine learning models based on the one or more supply chain data. Further, the one or more machine learning models may include one or more neural networks. Further, the one or more neural networks may include convolutional neural networks, recurrent neural networks, transformer networks, etc. Further, the one or more machine learning models may include one or more large language models. Further, the one or more machine learning models may include one or more pre-trained machine learning models. Further, the one or more machine learning models may be trained on a training dataset. Further, the training dataset may include one or more historical supply chain data. Further, the one or more historical supply chain data may include historical data associated with a historical transportation of one or more historical items. Further, the historical data associated with the historical transportation may include a mode of the historical transportation for transporting the one or more historical items, a pathway for the historical transportation of the one or more historical items, a means of the historical transportation of the historical one or more items, a schedule of the historical transportation of the one or more historical items, etc. Further, the one or more machine learning models may include one or more deep learning models. Further, the one or more machine learning models may be configured for providing a plurality of disruption instances associated with the transportation of the one or more items and an impact corresponding to each of the plurality of disruption instances. Further, the plurality of disruption instances and the plurality of impacts corresponding to the plurality of distribution instances may be determined based on the one or more additional data and the one or more supply chain data. Further, the one or more machine learning models may be trained by an attention transfer learning process. Further, the training of the one or more machine learning models may include establishing a first machine learning model and a second machine learning model for the one or more machine learning models. Further, the first machine learning model may be provided with the one or more supply chain data and the second machine learning model may be provided with the one or more additional data. Further, the training may include training the first machine learning model based on one or more historical supply chain data. Further, the training may include training the second machine learning model based on one or more historical additional data. Further, the training of the second machine learning model may include extracting a feature map from at least one of a plurality of hidden layers of each of the first machine learning model and the second machine learning model. Further, the training of the second machine learning model may include calculating one or more losses of the attention transfer learning for at least one of the plurality of hidden layers. Further, the training of the second machine learning model may include backpropagating the one or more losses into the second machine learning model. Further, each of the first machine learning model and the second machine learning model may include a neural network. Further, the neural network may include a hierarchical network. Further, the transfer learning may include a migration learning. Further, the neural network may include a plurality of neural network layers. Further, the plurality of neural network layers may include input layers, hidden layers, and output layers. Further, the plurality of neural network layers are fully connected layers. Further, the plurality of neural network layers may include a convolutional layer, an activation layer, a normalization layer, a classification layer, etc. Further, in an embodiment, the one or more machine learning models may be trained based on an implementation of a genetic algorithm, a decision tree algorithm, a regression algorithm, a classification algorithm, a quantum algorithm, etc. Further, the one or more machine learning models may be evolved based on at least one of the genetic algorithm and the quantum algorithm for processing the one or more additional data based on the one or more supply chain data based on the analyzing of the one or more additional data. Further, the one or more machine learning models may implement one or more algorithms for processing the one or more additional data based on the one or more supply chain data. Further, the implementation of the one or more algorithms may include executing the one or more algorithms. Further, the one or more algorithms may include a genetic algorithm, a quantum algorithm, etc. Further, in an embodiment, the one or more machine learning models may include a genetic algorithm, a quantum algorithm, a decision tree, a classifier, a clustering model, a support vector machine, a regression model, a Gaussian process model, a generative adversarial network, etc. Further, the analyzing of the one or more additional data using the one or more machine learning models based on the one or more supply chain data may be implemented on at least one of a classical computing device and a quantum computing device. Further, the processing device may include at least one of a classical processing device of the classical computing device, and a quantum processing device of the quantum computing device. Further, the analyzing of the one or more additional data using the one or more machine learning models based on the one or more supply chain data may be implemented on at least one of the classical computing device and the quantum computing device in at least one of a localized manner and a distributed manner. Further, the classical processing device emulates a quantum computing for implementing the one or more machine learning models for processing the one or more additional data based on the one or more supply chain data.

Further, the method 300 may include a step 308 of determining, using the processing device 904, a disruption in the supply chain based on the analyzing of the one or more additional data. Further, the disruption may include a potential disruption in the transportation of the one or more items. Further, the disruption interrupts the transportation of the one or more items. Further, the determining of the disruption may be based on the plurality of disruption instances and the plurality of impacts corresponding to the plurality of disruption instances. Further, the disruption may include an event that disrupts the supply chain. Further, the disruption may include one or more disruption scenarios in the supply chain. Further, in an embodiment, the determining of the disruption in the supply chain may be further based on implementing one or more algorithms. Further, the implementing of the one or more algorithms may include executing the one or more algorithms. Further, the one or more algorithms may include a genetic algorithm, a quantum algorithm, etc. Further, the one or more algorithms may be implemented on at least one of a classical computing device and a quantum computing device in at least one of a localized manner and a distributed manner. Further, a classical processing device of the classical computing device emulates a quantum computing.

Further, the method 300 may include a step 310 of generating, using the processing device 904, one or more recommendations for mitigating the disruption in the supply chain based on the disruption. Further, the one or more recommendations may include suggestions, alternatives, etc. for the mitigating of the disruption. Further, the mitigating of the disruption mitigates risks to the supply chain. Further, the generating of the one or more recommendations may be based on the one or more machine learning models. Further, in an embodiment, the generating of the one or more recommendations may be further based on implementing one or more algorithms. Further, the implementing of the one or more algorithms may include executing the one or more algorithms. Further, the one or more algorithms may include a genetic algorithm, a quantum algorithm, etc. Further, the one or more algorithms may be implemented on at least one of a classical computing device and a quantum computing device in at least one of a localized manner and a distributed manner. Further, a classical processing device of the classical computing device emulates a quantum computing.

Further, the method 300 may include a step 312 of transmitting, using the communication device 902, the one or more recommendations to the one or more devices.

Further, the method 300 may include a step 314 of storing, using a storage device 906, the one or more additional data. Further, the storing of the one or more additional data may include storing the one or more additional data in the one or more distributed ledgers. Further, the storing of the one or more additional data may include accessing the one or more distributed ledgers and creating one or more entries of the one or more additional data in the one or more distributed ledgers.

In some embodiments, the obtaining of the one or more additional data includes obtaining of the one or more additional data from one or more external devices in real time. Further, the one or more external devices may include one or more data sources, one or more sensors (such as environmental sensors (temperature sensors, wind sensors, humidity sensors, etc.)), one or more blockchain nodes, one or more blockchain gateway devices, one or more weather monitoring devices, etc.

In some embodiments, the one or more supply data includes one or more geographical region data of one or more geographical regions associated with the transportation of the one or more items. Further, the one or more geographical regions may include a city, a county, a state, a country, a river, a lake, an ocean, etc. Further, the one or more items may be transported through the one or more geographical regions. Further, the one or more additional data includes one or more weather data of one or more weathers of the one or more geographical regions. Further, the one or more weather data may include one or more weather conditions of the one or more geographical regions. Further, the one or more weather conditions may include temperature related conditions (such as a sunny condition, a cloudy condition, a hot condition, a cold condition, etc.), precipitation related conditions (such as rain, snow, hail, etc.), wind related conditions (such as calm, breezy, windy, gusty, etc.), storm related conditions (such as thunderstorm, tornado, hurricane, cyclone, typhoon, blizzard, etc.), visibility related conditions (such as fog, mist, haze, etc.), etc. Further, the analyzing of the one or more additional data using the one or more machine learning models based on the one or more supply chain data includes analyzing the one or more weather data using the one or more machine learning models based on the one or more geographical region data. Further, the method 300 includes generating, using the processing device 904, a prediction of a weather event for the one or more geographical regions based on the analyzing of the one or more weather data using the one or more machine learning models. Further, the determining of the disruption in the supply chain may be based on the generating of the prediction of the weather event. Further, the weather event may include a storm, a flood, a heatwave, etc.

In some embodiments, the one or more machine learning models include one or more of a regressive prediction model, a time series prediction model, and an auto-regressive integrated moving average (ARIMA) prediction model.

In some embodiments, the one or more supply data includes one or more geographical region data of one or more geographical regions associated with the transportation of the one or more items. Further, the one or more additional data includes one or more political situation data of one or more political situations of the one or more geographical regions. Further, the one or more political situation data may include one or more political conditions of the one or more geographical regions. Further, the one or more political conditions may include one or more policies, one or more tariffs, one or more regulations, one or more environmental policies, diplomatic relations, infrastructure conditions, etc. Further, the analyzing of the one or more additional data using the one or more machine learning models based on the one or more supply chain data includes analyzing the one or more political situation data using the one or more machine learning models based on the one or more geographical region data. Further, the method 300 includes generating, using the processing device 904, a prediction of a political event for the one or more geographical regions based on the analyzing of the one or more weather data using the one or more machine learning models. Further, the determining of the disruption in the supply chain may be based on the generating of the prediction of the political event. Further, the political event may include a sanction, a trade, a blockage, an embargo, a deal, a protest, a compliance, etc.

Further, in some embodiments, the one or more machine learning models identify conditions affecting the transportation of the one or more items and measure an impact of the conditions on the transportation of the one or more items. Further, the method 300 may include determining, using the processing device 904, a degree of the impact of one or more conditions based on the analyzing of the one or more additional data. Further, the method 300 may include comparing, using the processing device 904, the degree of the impact of the one or more conditions on the supply chain with a threshold impact degree. Further, the determining of the disruption in the supply chain may be based on the degree of the impact of the one or more conditions.

Further, in some embodiments, one or more steps (such as analyzing, determining, generating, processing, obtaining, executing, implementing, modifying, training, etc.) performed using the processing device may include processing of one or more data (such as the one or more supply chain data, the one or more additional data, the disruption, the one or more historical weather data, the one or more external weather predictions, etc.) using one or more quantum algorithms. Further, the processing of the one or more data may be locally performed by the processing device using the one or more quantum algorithms. Further, the localized processing of the one or more data allows for the processing of the one or more data in real time. Further, the localized processing of the one or more data using the one or more quantum algorithms may be performed using edge computing.

Further, in some embodiments, one or more steps (such as analyzing, determining, generating, processing, obtaining, executing, implementing, modifying, training, etc.) performed using the processing device may include processing of one or more data (such as the one or more supply chain data, the one or more additional data, the disruption, the one or more historical weather data, the one or more external weather predictions, etc.). Further, the processing of the one or more data may be performed with a goal of minimizing a carbon footprint associated with the processing. Further, one or more factors such as security and privacy of data may be considered while processing the one or more data using the processing device. Further, the processing of the one or more data by the processing device using the one or more quantum algorithms reduces the carbon footprint associated with the processing.

Figure 4:
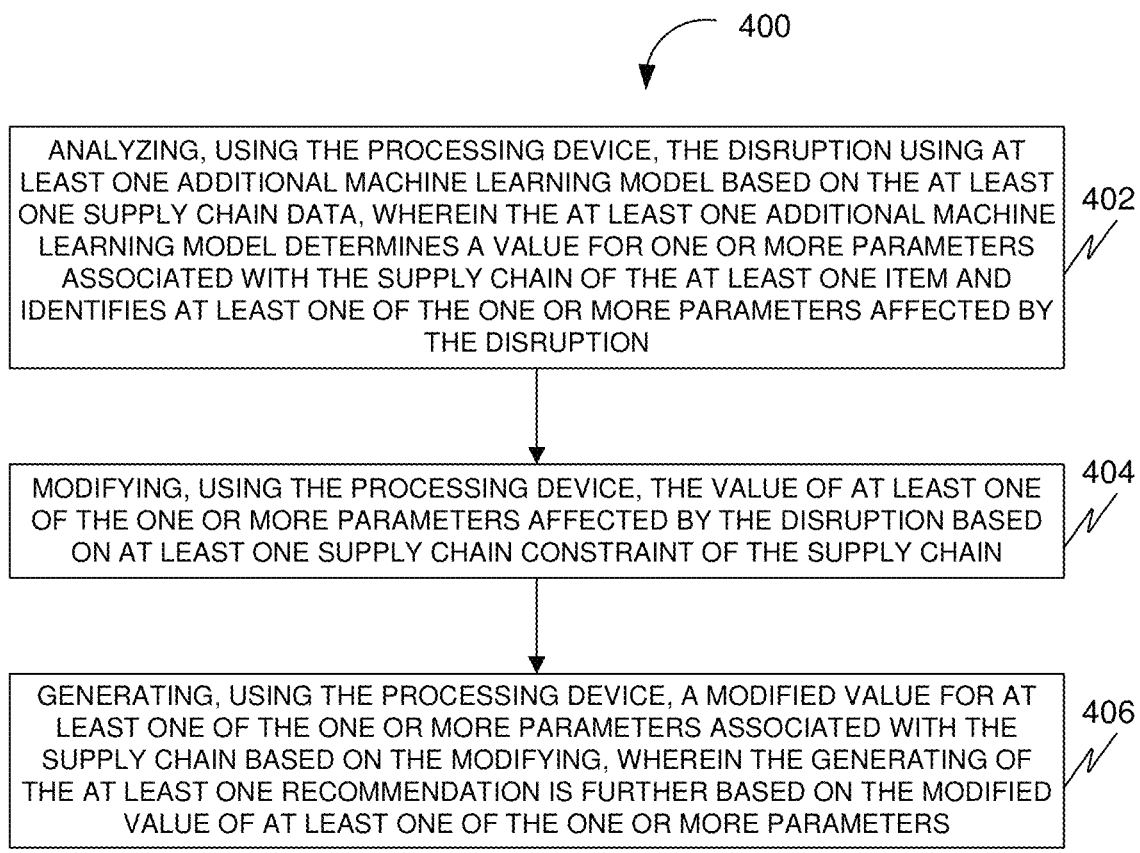
FIG. 4 illustrates a flowchart of a method 400 for facilitating managing of supply chains of items including generating, using the processing device 904, a modified value for at least one of the one or more parameters associated with the supply chain, in accordance with some embodiments.

FIG. 4 illustrates a flowchart of a method 400 for facilitating managing of supply chains of items including generating, using the processing device 904, a modified value for at least one of the one or more parameters associated with the supply chain, in accordance with some embodiments.

Further, in some embodiments, the method 400 may include a step 402 of analyzing, using the processing device 904, the disruption using one or more additional machine learning models based on the one or more supply chain data. Further, the one or more additional machine learning models may include one or more neural network models. Further, the one or more neural network models may include convolutional neural networks, recurrent neural networks, transformer networks, etc. Further, the one or more additional machine learning models may be pre-trained additional machine learning models. Further, the one or more additional machine learning models determine a value for one or more parameters associated with the supply chain of the one or more items and identify one or more of the one or more parameters affected by the disruption. Further, the one or more parameters may include a transportation transit time, a transportation cost, a transportation distance, a transportation mode, a transportation capacity, a transportation route, a compliance, a transportation time, a transportation condition, etc. Further, in some embodiments, the method 400 further may include a step 404 of modifying, using the processing device 904, the value of one or more of the one or more parameters affected by the disruption based on one or more supply chain constraints of the supply chain. Further, in some embodiments, the method 400 may include a step 406 of generating, using the processing device 904, a modified value for one or more of the one or more parameters associated with the supply chain based on the modifying. Further, the generating of the one or more recommendations may be based on the modified value of one or more of the one or more parameters. Further, in an embodiment, the one or more additional machine learning models may be trained based on an implementation of a genetic algorithm, a decision tree algorithm, a regression algorithm, a classification algorithm, a quantum algorithm, etc. Further, the one or more additional machine learning models may be evolved based on at least one of the genetic algorithm and the quantum algorithm for processing the disruption based on the one or more supply chain data. Further, the one or more additional machine learning models may implement one or more algorithms for processing the disruption based on the one or more supply chain data based on the analyzing of the disruption. Further, the one or more algorithms may include a genetic algorithm, a k-mean clustering algorithm, a k-nearest neighbor algorithm, a quantum algorithm, etc. Further, in an embodiment, the one or more additional machine learning models may include a genetic algorithm, a quantum algorithm, a decision tree, a classifier, a clustering model, a support vector machine, a regression model, a Gaussian process model, a generative adversarial network, etc. Further, the analyzing of the disruption using the one or more additional machine learning models based on the one or more supply chain data may be implemented on at least one of a classical computing device and a quantum computing device. Further, the processing device may include at least one of a classical processing device of the classical computing device, and a quantum processing device of the quantum computing device. Further, the analyzing of the disruption using the one or more additional machine learning models based on the one or more supply chain data may be implemented on at least one of the classical computing device and the quantum computing device in at least one of a localized manner and a distributed manner. Further, the classical processing device emulates a quantum computing for implementing the one or more additional machine learning models for processing the disruption based on the one or more supply chain data. Further, in an embodiment, the modifying of the value of one or more of the one or more parameters may be further based on implementing one or more algorithms. Further, the implementing of the one or more algorithms may include executing the one or more algorithms. Further, the one or more algorithms may include a genetic algorithm, a quantum algorithm, etc. Further, the one or more algorithms may be implemented on at least one of the classical computing device and the quantum computing device in at least one of a localized manner and a distributed manner. Further, the classical processing device emulates a quantum computing.

Figure 5:
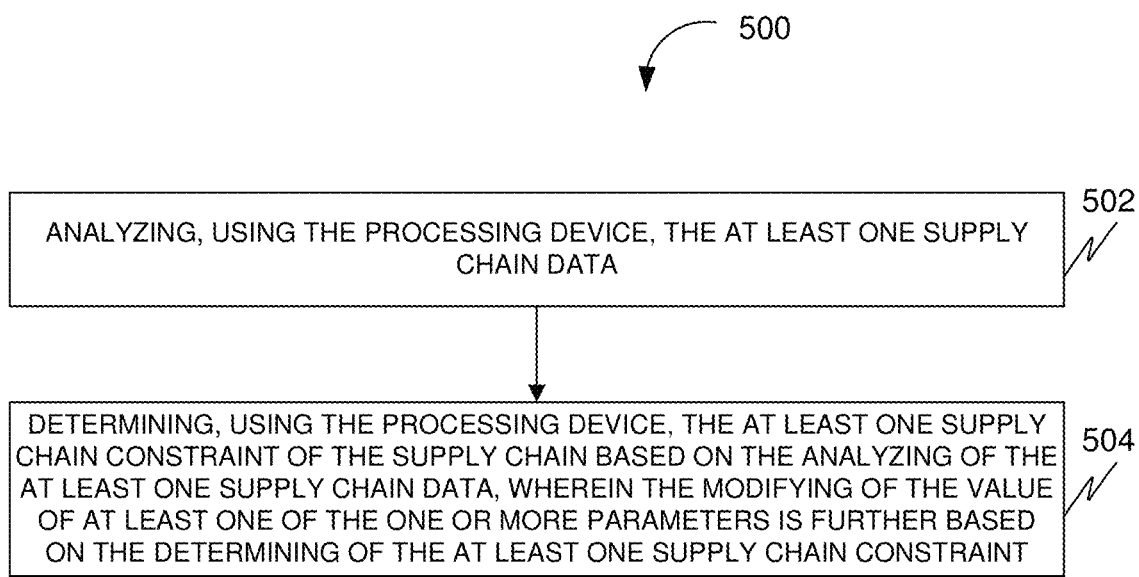
FIG. 5 illustrates a flowchart of a method 500 for facilitating managing of supply chains of items including determining, using the processing device 904, the at least one supply chain constraint of the supply chain, in accordance with some embodiments.

FIG. 5 illustrates a flowchart of a method 500 for facilitating managing of supply chains of items including determining, using the processing device 904, the at least one supply chain constraint of the supply chain, in accordance with some embodiments.

Further, in some embodiments, the method 500 may include a step 502 of analyzing, using the processing device 904, the one or more supply chain data. Further, in some embodiments, the method 500 may include a step 504 of determining, using the processing device 904, the one or more supply chain constraints of the supply chain based on the analyzing of the one or more supply chain data. Further, the modifying of the value of one or more of the one or more parameters may be based on the determining of the one or more supply chain constraints. Further, the one or more supply chain constraints may include a transportation capacity constraint, a transportation infrastructure limitation, a compliance restriction, an environmental condition restriction, a cost constraint, a time constraint, etc. Further, in an embodiment, the analyzing of the one or more supply chain data may be further based on implementing one or more algorithms. Further, the determining of the one or more supply chain constraints of the supply chain may be further based on the implementing of the one or more algorithms. Further, the implementing of the one or more algorithms may include executing the one or more algorithms. Further, the one or more algorithms may include a genetic algorithm, a quantum algorithm, etc. Further, the one or more algorithms may be implemented on at least one of a classical computing device and a quantum computing device in at least one of a localized manner and a distributed manner. Further, a classical processing device of the classical computing device emulates a quantum computing.

Figure 6:
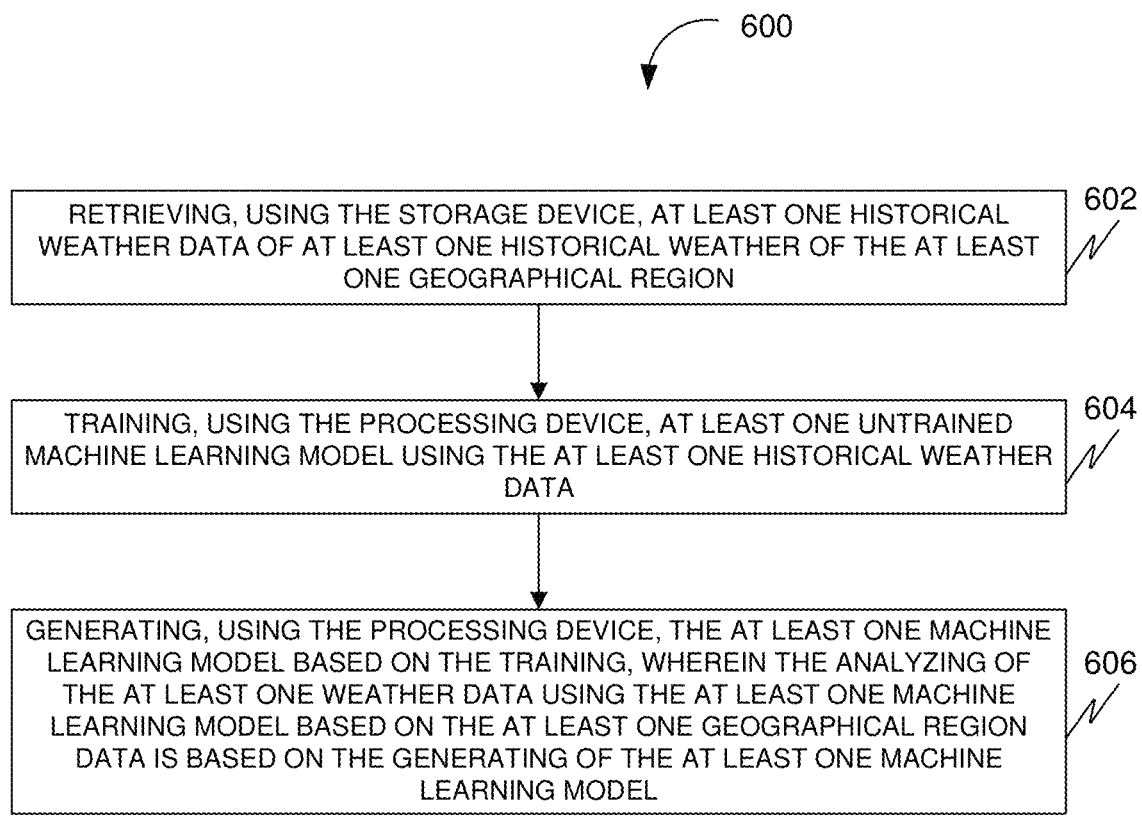
FIG. 6 illustrates a flowchart of a method 600 for facilitating managing of supply chains of items including generating, using the processing device 904, the at least one machine learning model, in accordance with some embodiments.

FIG. 6 illustrates a flowchart of a method 600 for facilitating managing of supply chains of items including generating, using the processing device 904, the at least one machine learning model, in accordance with some embodiments.

Further, in some embodiments, the method 600 may include a step 602 of retrieving, using the storage device 906, one or more historical weather data of one or more historical weathers of the one or more geographical regions. Further, in some embodiments, the method 600 may include a step 604 of training, using the processing device 904, one or more untrained machine learning models using the one or more historical weather data. Further, in some embodiments, the method 600 may include a step 606 of generating, using the processing device 904, the one or more machine learning models based on the training. Further, the analyzing of the one or more weather data using the one or more machine learning models based on the one or more geographical region data may be based on the generating of the one or more machine learning models. Further, the one or more untrained machine learning models may include one or more pre-trained machine learning models. Further, the training of the one or more untrained machine learning models may include tuning the one one or more pre-trained machine learning models. Further, the tuning may include partial training, fine tuning, etc. Further, the retrieving of the one or more historical weather data may include accessing one or more second distributed ledgers associated with one or more second blockchains. Further, the retrieving of the one or more historical weather data may include obtaining the one or more historical weather data from the one or more second distributed ledgers. Further, the one or more second distributed ledgers may be implemented by the one or more second blockchains to verifiably store the one or more historical weather data. Further, the retrieving of the one or more historical weather data may include interacting with one or more second smart contracts stored on the one or more second distributed ledgers for obtaining the one or more historical weather data. Further, the training of the one or more untrained machine learning models using the one or more historical weather data may be based on an implementation of a genetic algorithm, a decision tree algorithm, a regression algorithm, a classification algorithm, a quantum algorithm, etc.

Figure 7:
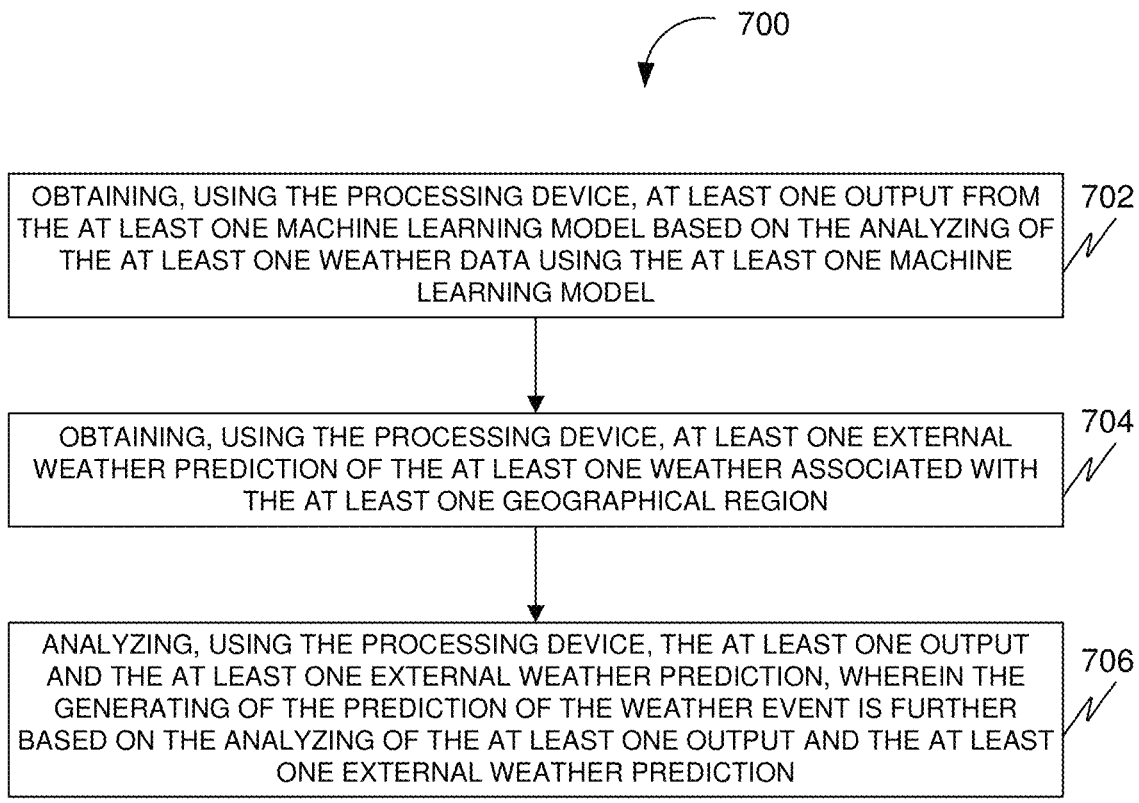
FIG. 7 illustrates a flowchart of a method 700 for facilitating managing of supply chains of items including analyzing, using the processing device 904, the at least one output and the at least one external weather prediction, in accordance with some embodiments.

FIG. 7 illustrates a flowchart of a method 700 for facilitating managing of supply chains of items including analyzing, using the processing device 904, the at least one output and the at least one external weather prediction, in accordance with some embodiments.

Further, in some embodiments, the method 700 may include a step 702 of obtaining, using the processing device 904, one or more outputs from the one or more machine learning models based on the analyzing of the one or more weather data using the one or more machine learning models. Further, in some embodiments, the method 700 may include a step 704 of obtaining, using the processing device 904, one or more external weather predictions of the one or more weathers associated with the one or more geographical regions. Further, in some embodiments, the method 700 may include a step 706 of analyzing, using the processing device 904, the one or more outputs and the one or more external weather predictions. Further, the generating of the prediction of the weather event may be based on the analyzing of the one or more outputs and the one or more external weather predictions. Further, the one or more external weather predictions may be obtained from one or more external devices. Further, in an embodiment, the obtaining of the one or more external weather predictions may include accessing one or more third distributed ledgers associated with one or more third blockchains. Further, the obtaining of the one or more external weather predictions may include obtaining the one or more external weather predictions from the one or more third distributed ledgers based on the accessing. Further, the one or more external weather predictions may be stored on the one or more third distributed ledgers. Further, the one or more third distributed ledgers may be updated based on a weather prediction data from a third blockchain network. Further, the one or more third distributed ledgers may be implemented by the one or more third blockchains to verifiably store a plurality of external weather predictions. Further, the obtaining of the one or more external weather predictions may include interacting with one or more third smart contracts stored on the one or more third distributed ledgers for obtaining the one or more external weather predictions. Further, in an embodiment, the analyzing of the one or more outputs and the one or more external weather predictions may be further based on implementing one or more algorithms. Further, the implementing of the one or more algorithms may include executing the one or more algorithms. Further, the one or more algorithms may include a genetic algorithm, a quantum algorithm, etc. Further, the one or more algorithms may be implemented on at least one of a classical computing device and a quantum computing device in at least one of a localized manner and a distributed manner. Further, a classical processing device of the classical computing device emulates a quantum computing.

Figure 8:
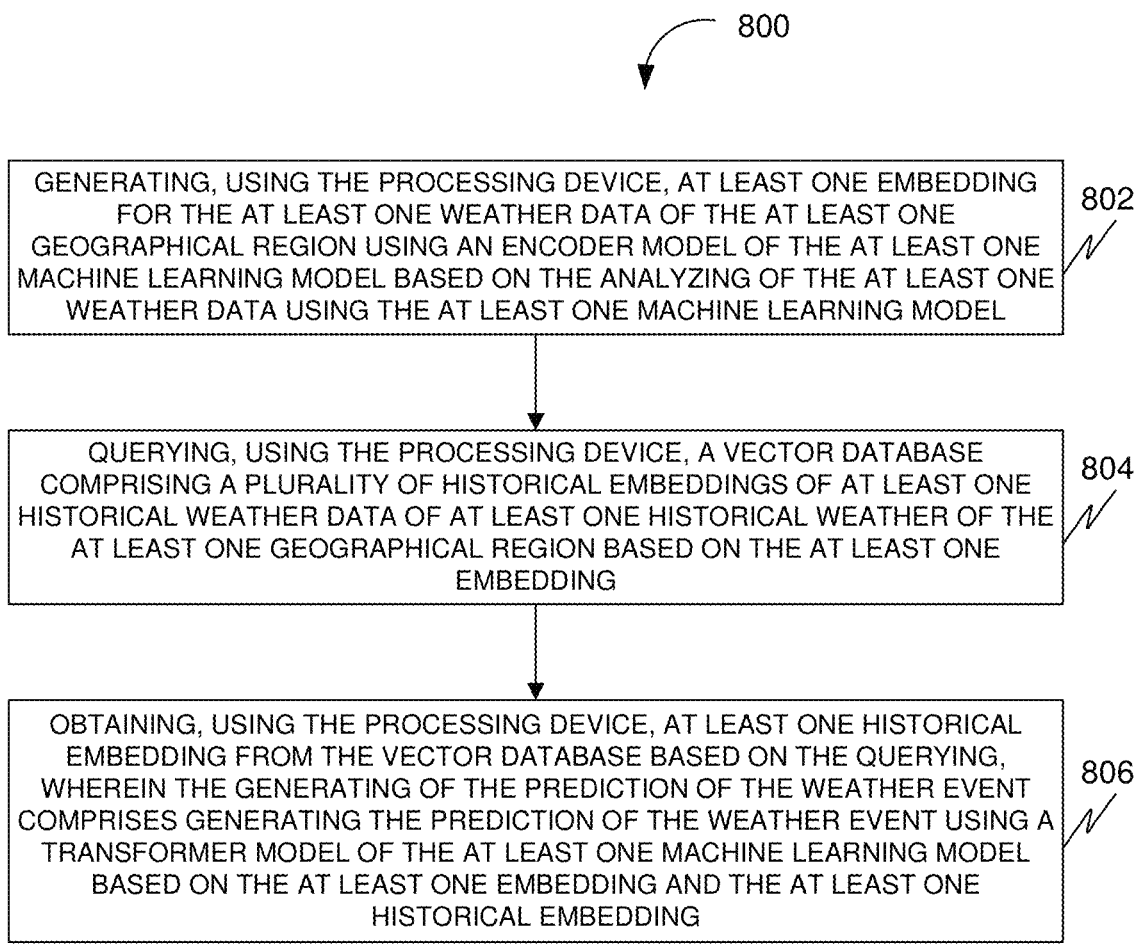
FIG. 8 illustrates a flowchart of a method 800 for facilitating managing of supply chains of items including obtaining, using the processing device 904, at least one historical embedding from the vector database, in accordance with some embodiments.

FIG. 8 illustrates a flowchart of a method 800 for facilitating managing of supply chains of items including obtaining, using the processing device 904, at least one historical embedding from the vector database, in accordance with some embodiments.

Further, in some embodiments, the method 800 further may include generating, using the processing device 904, one or more embeddings for the one or more weather data of the one or more geographical regions using an encoder model of the one or more machine learning models based on the analyzing of the one or more weather data using the one or more machine learning models. Further, the one or more embeddings may include one or more vector representations. Further, in some embodiments, the method 800 may include querying, using the processing device 904, a vector database comprising two or more historical embeddings of one or more historical weather data of one or more historical weathers of the one or more geographical regions based on the one or more embeddings. Further, the two or more historical embeddings may be stored in the vector database. Further, in some embodiments, the method 800 may include obtaining, using the processing device 904, one or more historical embeddings from the vector database based on the querying. Further, the generating of the prediction of the weather event includes generating the prediction of the weather event using a transformer model of the one or more machine learning models based on the one or more embeddings and the one or more historical embeddings. Further, the transformer model may include a generative transformer, a bidirectional encoder representation from transformer, a bidirectional and auto-regressive transformer, etc.

Figure 9:
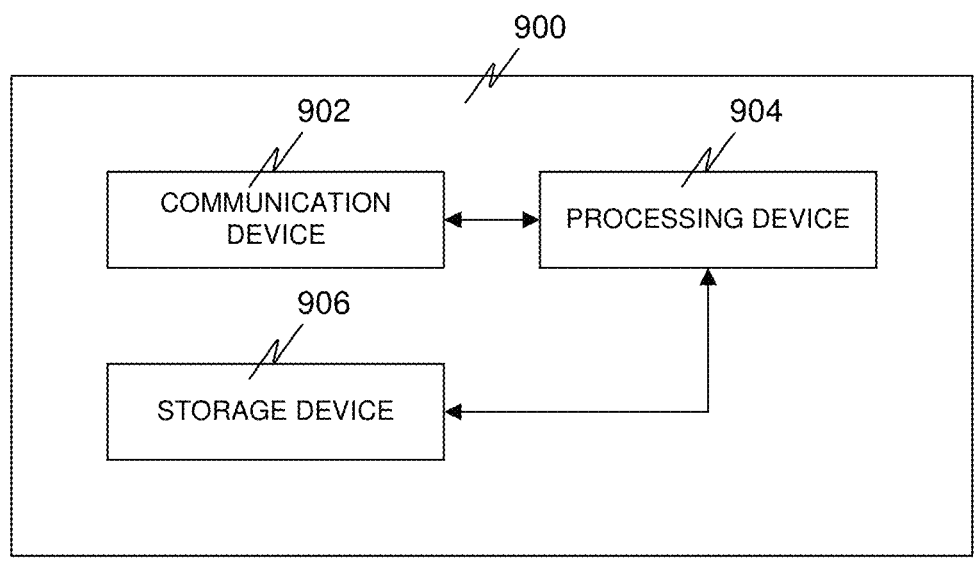
FIG. 9 illustrates a block diagram of a system 900 for facilitating managing of supply chains of items, in accordance with some embodiments.

FIG. 9 illustrates a block diagram of a system 900 for facilitating managing of supply chains of items, in accordance with some embodiments.

Figure 10:
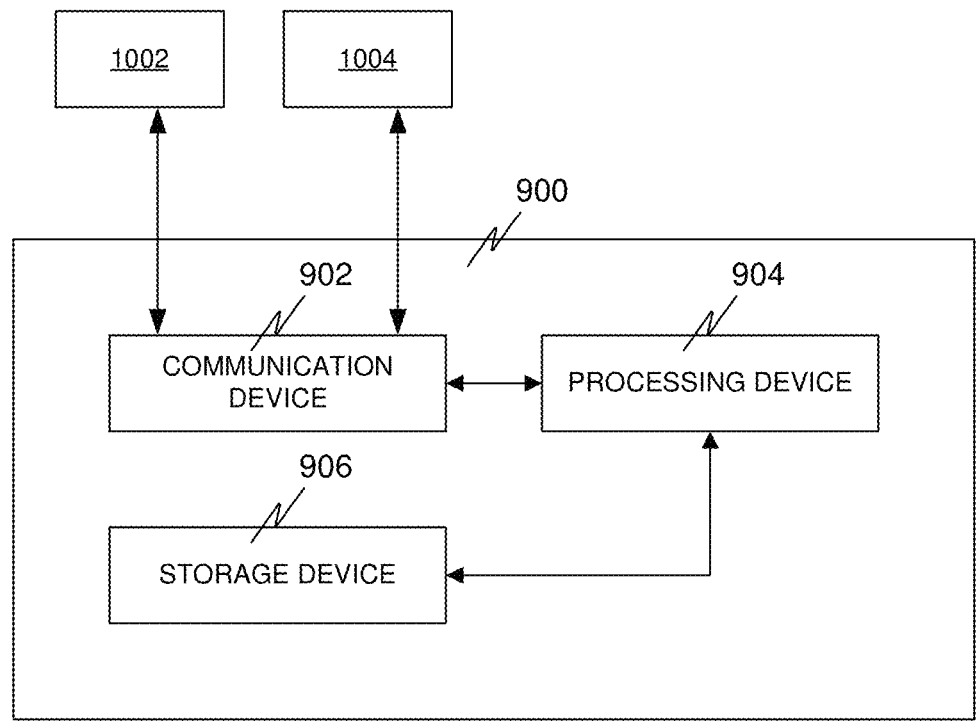
FIG. 10 illustrates a block diagram of the system 900, in accordance with some embodiments.

Accordingly, the system 900 may include a communication device 902. Further, the communication device 902 may be configured for receiving one or more supply chain data associated with a supply chain of one or more items from one or more devices 1002, as shown in FIG. 10. Further, the supply chain includes a transportation of the one or more items. Further, the communication device 902 may be configured for transmitting one or more recommendations to the one or more devices 1002. Further, the system 900 may include a processing device 904 communicatively coupled with the communication device 902. Further, the processing device 904 may be configured for obtaining one or more additional data associated with the supply chain based on the one or more supply chain data. Further, the processing device 904 may be configured for analyzing the one or more additional data using one or more machine learning models based on the one or more supply chain data. Further, the processing device 904 may be configured for determining a disruption in the supply chain based on the analyzing of the one or more additional data. Further, the processing device 904 may be configured for generating the one or more recommendations for mitigating the disruption in the supply chain based on the disruption. Further, the system 900 may include a storage device 906 communicatively coupled with the processing device 904. Further, the storage device 906 may be configured for storing the one or more additional data.

Further, in some embodiments, the processing device 904 may be configured for analyzing the disruption using one or more additional machine learning models based on the one or more supply chain data. Further, the one or more additional machine learning models determines a value for one or more parameters associated with the supply chain of the one or more items and identify one or more of the one or more parameters affected by the disruption. Further, the processing device 904 may be configured for modifying the value of one or more of the one or more parameters affected by the disruption based on one or more supply chain constraints of the supply chain. Further, the processing device 904 may be configured for generating a modified value for one or more of the one or more parameters associated with the supply chain based on the modifying. Further, the generating of the one or more recommendations may be based on the modified value of one or more of the one or more parameters.

Further, in some embodiments, the processing device 904 may be configured for analyzing the one or more supply chain data. Further, the processing device 904 may be configured for determining the one or more supply chain constraints of the supply chain based on the analyzing of the one or more supply chain data. Further, the modifying of the value of one or more of the one or more parameters may be based on the determining of the one or more supply chain constraints.

In some embodiments, the obtaining of the one or more additional data includes obtaining of the one or more additional data from one or more external devices 1004, as shown in FIG. 10, in real time.

In some embodiments, the one or more supply data includes one or more geographical region data of one or more geographical regions associated with the transportation of the one or more items. Further, the one or more additional data includes one or more weather data of one or more weathers of the one or more geographical regions. Further, the analyzing of the one or more additional data using the one or more machine learning models based on the one or more supply chain data includes analyzing the one or more weather data using the one or more machine learning models based on the one or more geographical region data. Further, the processing device 904 may be configured for generating a prediction of a weather event for the one or more geographical regions based on the analyzing of the one or more weather data using the one or more machine learning models. Further, the determining of the disruption in the supply chain may be based on the generating of the prediction of the weather event.

In some embodiments, the one or more machine learning models include one or more of a regressive prediction model, a time series prediction model, and an auto-regressive integrated moving average (ARIMA) prediction model.

Further, in some embodiments, the storage device 906 may be configured for retrieving one or more historical weather data of one or more historical weathers of the one or more geographical regions. Further, the processing device 904 may be configured for training at least one untrained machine learning model using the one or more historical weather data. Further, the processing device 904 may be configured for generating the one or more machine learning models based on the training. Further, the analyzing of the one or more weather data using the one or more machine learning models based on the one or more geographical region data may be based on the generating of the one or more machine learning models.

Further, in some embodiments, the processing device 904 may be configured for obtaining one or more outputs from the one or more machine learning models based on the analyzing of the one or more weather data using the one or more machine learning models. Further, the processing device 904 may be configured for obtaining one or more external weather predictions of the one or more weathers associated with the one or more geographical regions. Further, the processing device 904 may be configured for analyzing the one or more outputs and the one or more external weather predictions. Further, the generating of the prediction of the weather event may be based on the analyzing of the one or more outputs and the one or more external weather predictions.

Further, in some embodiments, the processing device 904 may be configured for generating one or more embeddings for the one or more weather data of the one or more geographical regions using an encoder model of the one or more machine learning models based on the analyzing of the one or more weather data using the one or more machine learning models. Further, the processing device 904 may be configured for querying a vector database comprising two or more historical embeddings of one or more historical weather data of one or more historical weathers of the one or more geographical regions based on the one or more embeddings. Further, the processing device 904 may be configured for obtaining one or more historical embeddings from the vector database based on the querying. Further, the generating of the prediction of the weather event includes generating the prediction of the weather event using a transformer model of the one or more machine learning models based on the one or more embeddings and the one or more historical embeddings.

In some embodiments, the one or more supply data includes one or more geographical region data of one or more geographical regions associated with the transportation of the one or more items. Further, the one or more additional data includes one or more political situation data of one or more political situations of the one or more geographical regions. Further, the analyzing of the one or more additional data using the one or more machine learning models based on the one or more supply chain data includes analyzing the one or more political situation data using the one or more machine learning models based on the one or more geographical region data. Further, the processing device 904 may be configured for generating a prediction of a political event for the one or more geographical regions based on the analyzing of the one or more weather data using the one or more machine learning models. Further, the determining of the disruption in the supply chain may be based on the generating of the prediction of the political event.

FIG. 10 illustrates a block diagram of the system 900, in accordance with some embodiments.

Although the invention has been explained in relation to its preferred embodiment, it is to be understood that many other possible modifications and variations can be made without departing from the spirit and scope of the invention as hereinafter claimed.

What is claimed is:

1. A method for facilitating managing of supply chains of items, the method comprising:
   receiving, using a communication device, at least one supply chain data associated with a supply chain of at least one item from at least one device, wherein the supply chain comprises a transportation of the at least one item;
   obtaining, using a processing device, at least one additional data associated with the supply chain based on the at least one supply chain data;
   analyzing, using the processing device, the at least one additional data using at least one machine learning model based on the at least one supply chain data, wherein the at least one machine learning model further identifies conditions affecting the transportation of the at least one item and measures an impact of the conditions on the transportation of the at least one item, wherein the at least one supply chain data comprises at least one geographical region data of at least one geographical region associated with the transportation of the at least one item, wherein the at least one additional data comprises at least one weather data of at least one weather of the at least one geographical region, wherein the analyzing of the at least one additional data using the at least one machine learning model based on the at least one supply chain data comprises analyzing the at least one weather data using the at least one machine learning model based on the at least one geographical region data, wherein the at least one weather data comprises a plurality of weather conditions of the at least one geographical region, wherein the plurality of weather conditions comprises each of a temperature related condition, a precipitation related condition, a wind related condition, a storm related condition, and a visibility related condition;
   determining, using the processing device, a degree of the impact of one or more conditions based on the analyzing of the at least one additional data;
   generating, using the processing device, at least one embedding for the at least one weather data of the at least one geographical region using an encoder model of the at least one machine learning model based on the analyzing of the at least one weather data using the at least one machine learning model;
   querying, using the processing device, a vector database comprising a plurality of historical embeddings of at least one historical weather data of at least one historical weather of the at least one geographical region based on the at least one embedding;
   obtaining, using the processing device, at least one historical embedding from the vector database based on the querying;
   generating, using the processing device, a prediction of a weather event for the at least one geographical region based on the analyzing of the at least one weather data using the at least one machine learning model, wherein the generating of the prediction of the weather event comprises generating the prediction of the weather event using a transformer model of the at least one machine learning model based on the at least one embedding and the at least one historical embedding;
   determining, using the processing device, a disruption in the supply chain based on the analyzing of the at least one additional data, wherein the determining of the disruption in the supply chain is further based on the generating of the prediction of the weather event, wherein the determining of the disruption in the supply chain is further based on the degree of the impact of the one or more conditions;
   generating, using the processing device, at least one recommendation for mitigating the disruption in the supply chain based on the disruption;
   transmitting, using the communication device, the at least one recommendation to the at least one device; and
   storing, using a storage device, the at least one additional data.

2. The method of claim 1 further comprising:
   analyzing, using the processing device, the disruption using at least one additional machine learning model based on the at least one supply chain data, wherein the at least one additional machine learning model determines a value for one or more parameters associated with the supply chain of the at least one item and identifies at least one of the one or more parameters affected by the disruption;
   modifying, using the processing device, the value of at least one of the one or more parameters affected by the disruption based on at least one supply chain constraint of the supply chain; and
   generating, using the processing device, a modified value for at least one of the one or more parameters associated with the supply chain based on the modifying, wherein the generating of the at least one recommendation is further based on the modified value of at least one of the one or more parameters.

3. The method of claim 2 further comprising:
   analyzing, using the processing device, the at least one supply chain data; and
   determining, using the processing device, the at least one supply chain constraint of the supply chain based on the analyzing of the at least one supply chain data, wherein the modifying of the value of at least one of the one or more parameters is further based on the determining of the at least one supply chain constraint.

4. The method of claim 1, wherein the obtaining of the at least one additional data comprises obtaining of the at least one additional data from at least one external device in real time.

5. The method of claim 1, wherein the at least one machine learning model comprises at least one of a regressive prediction model, a time series prediction model, and an auto-regressive integrated moving average (ARIMA) prediction model.

6. The method of claim 1 further comprising:
retrieving, using the storage device, at least one historical weather data of at least one historical weather of the at least one geographical region;
training, using the processing device, at least one untrained machine learning model using the at least one historical weather data; and
generating, using the processing device, the at least one machine learning model based on the training, wherein the analyzing of the at least one weather data using the at least one machine learning model based on the at least one geographical region data is based on the generating of the at least one machine learning model.

7. The method of claim 1 further comprising:
obtaining, using the processing device, at least one output from the at least one machine learning model based on the analyzing of the at least one weather data using the at least one machine learning model;
obtaining, using the processing device, at least one external weather prediction of the at least one weather associated with the at least one geographical region, wherein the obtaining of the at least one external weather prediction comprises:
accessing at least one database; and
obtaining the at least one external weather prediction based on the accessing, wherein the at least one database is updated based on a weather prediction data; and
analyzing, using the processing device, the at least one output and the at least one external weather prediction, wherein the generating of the prediction of the weather event is further based on the analyzing of the at least one output and the at least one external weather prediction.

8. The method of claim 1, wherein the at least one additional data comprises at least one political situation data of at least one political situation of the at least one geographical region, wherein the analyzing of the at least one additional data using the at least one machine learning model based on the at least one supply chain data comprises analyzing the at least one political situation data using the at least one machine learning model based on the at least one geographical region data, wherein the analyzing of the at least one political situation data comprises processing the at least one political situation data, wherein the processing of the at least one political situation data is locally performed using at least one quantum algorithm, wherein the method further comprises generating, using the processing device, a prediction of a political event for the at least one geographical region based on the analyzing using the at least one machine learning model, wherein the determining of the disruption in the supply chain is further based on the generating of the prediction of the political event.

9. A system for facilitating managing of supply chains of items, the system comprising:
a communication device configured for:
receiving at least one supply chain data associated with a supply chain of at least one item from at least one device, wherein the supply chain comprises a transportation of the at least one item; and
transmitting at least one recommendation to the at least one device;
a processing device communicatively coupled with the communication device, wherein the processing device is configured for:
obtaining at least one additional data associated with the supply chain based on the at least one supply chain data;
analyzing the at least one additional data using at least one machine learning model based on the at least one supply chain data, wherein the at least one machine learning model further identifies conditions affecting the transportation of the at least one item and measures an impact of the conditions on the transportation of the at least one item, wherein the at least one supply chain data comprises at least one geographical region data of at least one geographical region associated with the transportation of the at least one item, wherein the at least one additional data comprises at least one weather data of at least one weather of the at least one geographical region, wherein the analyzing of the at least one additional data using the at least one machine learning model based on the at least one supply chain data comprises analyzing the at least one weather data using the at least one machine learning model based on the at least one geographical region data, wherein the at least one weather data comprises a plurality of weather conditions of the at least one geographical region, wherein the plurality of weather conditions comprises each of a temperature related condition, a precipitation related condition, a wind related condition, a storm related condition, and a visibility related condition;
determining a degree of the impact of one or more conditions based on the analyzing of the at least one additional data;
generating at least one embedding for the at least one weather data of the at least one geographical region using an encoder model of the at least one machine learning model based on the analyzing of the at least one weather data using the at least one machine learning model;
querying a vector database comprising a plurality of historical embeddings of at least one historical weather data of at least one historical weather of the at least one geographical region based on the at least one embedding;
obtaining at least one historical embedding from the vector database based on the querying;
generating a prediction of a weather event for the at least one geographical region based on the analyzing of the at least one weather data using the at least one machine learning model, wherein the generating of the prediction of the weather event comprises generating the prediction of the weather event using a transformer model of the at least one machine learning model based on the at least one embedding and the at least one historical embedding;
determining a disruption in the supply chain based on the analyzing of the at least one additional data, wherein the determining of the disruption in the supply chain is further based on the generating of the prediction of the weather event, wherein the determining of the disruption in the supply chain is further based on the degree of the impact of the one or more conditions; and
generating the at least one recommendation for mitigating the disruption in the supply chain based on the disruption; and
a storage device communicatively coupled with the processing device, wherein the storage device is configured for storing the at least one additional data.

10. The system of claim 9, wherein the processing device is further configured for:

analyzing the disruption using at least one additional machine learning model based on the at least one supply chain data, wherein the at least one additional machine learning model determines a value for one or more parameters associated with the supply chain of the at least one item and identifies at least one of the one or more parameters affected by the disruption;

modifying the value of at least one of the one or more parameters affected by the disruption based on at least one supply chain constraint of the supply chain; and generating a modified value for at least one of the one or more parameters associated with the supply chain based on the modifying, wherein the generating of the at least one recommendation is further based on the modified value of at least one of the one or more parameters.

11. The system of claim 10, wherein the processing device is further configured for:

analyzing the at least one supply chain data; and determining the at least one supply chain constraint of the supply chain based on the analyzing of the at least one supply chain data, wherein the modifying of the value of at least one of the one or more parameters is further based on the determining of the at least one supply chain constraint.

12. The system of claim 9, wherein the obtaining of the at least one additional data comprises obtaining of the at least one additional data from at least one external device in real time.

13. The system of claim 9, wherein the at least one machine learning model comprises at least one of a regressive prediction model, a time series prediction model, and an auto-regressive integrated moving average (ARIMA) prediction model.

14. The system of claim 9, wherein the storage device is further configured for retrieving at least one historical weather data of at least one historical weather of the at least one geographical region, wherein the processing device is further configured for training at least one untrained machine learning model using the at least one historical weather data; and generating the at least one machine learning model based on the training, wherein the analyzing of the at least one weather data using the at least one machine learning model based on the at least one geographical region data is based on the generating of the at least one machine learning model.

15. The system of claim 9, wherein the processing device is further configured for:

obtaining at least one output from the at least one machine learning model based on the analyzing of the at least one weather data using the at least one machine learning model;

obtaining at least one external weather prediction of the at least one weather associated with the at least one geographical region, wherein the obtaining of the at least one external weather prediction comprises:

accessing at least one database; and obtaining the at least one external weather prediction based on the accessing, wherein the at least one database is updated based on a weather prediction data; and analyzing the at least one output and the at least one external weather prediction, wherein the generating of the prediction of the weather event is further based on the analyzing of the at least one output and the at least one external weather prediction.

16. The system of claim 9, wherein the at least one additional data comprises at least one political situation data of at least one political situation of the at least one geographical region, wherein the analyzing of the at least one additional data using the at least one machine learning model based on the at least one supply chain data comprises analyzing the at least one political situation data using the at least one machine learning model based on the at least one geographical region data, wherein the analyzing of the at least one political situation data comprises processing the at least one political situation data, wherein the processing of the at least one political situation data is locally performed using at least one quantum algorithm, wherein the processing device is further configured for generating a prediction of a political event for the at least one geographical region based on the analyzing using the at least one machine learning model, wherein the determining of the disruption in the supply chain is further based on the generating of the prediction of the political event.

* * * * *